(12) United States Patent
Burckart et al.

(10) Patent No.: US 8,732,108 B2
(45) Date of Patent: May 20, 2014

(54) RULE AUTHORING FOR EVENTS IN A GRID ENVIRONMENT

(75) Inventors: Erik J Burckart, Raleigh, NC (US);
Edward M Lynch, Gentilly (FR);
Victor S Moore, Lake City, FL (US);
William T Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/899,637

(22) Filed: Oct. 7, 2010

(65) Prior Publication Data
US 2012/0089549 A1     Apr. 12, 2012

(51) Int. Cl.
*G06F 5/00*     (2006.01)

(52) U.S. Cl.
USPC .............................. 706/47; 719/317; 705/311

(58) Field of Classification Search
USPC ........................................................... 706/47
See application file for complete search history.

(56) References Cited

U.S. PATENT DOCUMENTS

| | | | |
|---|---|---|---|
| 6,810,429 B1 | 10/2004 | Walsh et al. | |
| 6,868,413 B1 | 3/2005 | Grindrod et al. | |
| 6,993,514 B2 | 1/2006 | Majoor | |
| 7,577,904 B1 | 8/2009 | Obilisetty | |
| 2003/0212629 A1 | 11/2003 | King | |
| 2007/0150330 A1 | 6/2007 | McGoveran | |
| 2009/0077124 A1* | 3/2009 | Spivack et al. | 707/103 Y |
| 2009/0125500 A1 | 5/2009 | Arends et al. | |
| 2009/0157586 A1* | 6/2009 | Zhang et al. | 706/47 |
| 2011/0184886 A1* | 7/2011 | Shoham | 705/400 |

* cited by examiner

Primary Examiner — Jeffrey A Gaffin
Assistant Examiner — Kalpana Bharadwaj
(74) Attorney, Agent, or Firm — Parashos Kalaitzis; Robert C. Rolnik

(57) ABSTRACT

A rules engine can be initialized as part of an object grid, wherein the rules engine is executable code executing using computer resources. The rules engine updates a business mapper. The rules engine receives a business rule definition to form a business rule. The rules engine determines business terms are present in the business rule. The rules engine converts the business terms to technical terms based on the business mapper, responsive to a determination that business terms are present. The rules engine determines that the business rule comprises a temporal rule. The rules engine receives rule criteria, wherein the rule criteria is at least one selected from the group consisting of frequency, delay and timing dependency, responsive to the determination that the business rule is a temporal rule. The rules engine stores the business rule to the rules engine. The rules engine publishes the business rule to a publish-subscribe topic.

12 Claims, 6 Drawing Sheets

*FIG. 4*

Business Rule: Minimum credit score

401 — If
402 —   the credit score of 'the borrower' is less than 200
403 — then
404 —   add "Credit score below 200" to the message of 'the loan';
405 —   reject 'the loan';

*FIG. 5*

| TECHNICAL TERM | VERBALIZATION AS A BUSINESS TERM |
|---|---|
| 501 — HTTP Error 404 | Page not found |
| 502 — 123 15 1234 | The borrower |
|  |  |
|  |  |
|  |  |

…

RULE AUTHORING FOR EVENTS IN A GRID ENVIRONMENT

BACKGROUND OF THE INVENTION

1. Field of the Invention

The present invention relates generally to a data processing system, and computer program product for defining data processing system rules based on business terms. More specifically, the present invention relates to creating rules in a networked environment in a scalable manner.

2. Description of the Related Art

Modern uses of networked computers leverage grid computer resources that can rely on plural Java virtual machines to provide a distributed cache of objects including executable objects and data-only objects. Java™ is a trademark of Oracle Corp. in the United States, other countries, or both.

The operation of the grid is controlled by, for example, objects described using the Java programming language. Java relies on a grammar, reserved words, and style, that are generally unfamiliar among business people. The gap in knowledge among business people forces them to rely on specialized staff to explain the content of such objects, as well as modify objects to address business goals. The reliance on technical terms in such objects can create delays in an organization's staff in revising objects to address changing business needs, since two people typically are needed to make adjustments.

A technical term is a word defined in technical dictionaries, an error message, reserved word, or mnemonic phrase. Such terms can be defined in programming language specifications or industry standards within engineering, mechanical, or scientific industries. On the other hand, a business term is an expression of status that describes business conditions, risks, or opportunities in a language that can be spoken. A business term can be any part of speech or phrase. A business term may include trademarks as well as proper nouns, such as personal names, places, and the like. Some business terms may correspond to (or map to) technical terms. Some business terms may be identical to the technical term with which it corresponds. However, a more common arrangement is that a technical term is different from the business term to which it corresponds.

A way to harmonize the disparate terminologies, as well as assure robust operation of responses to changing business environment, could be helpful.

SUMMARY

The present invention provides a computer program product and data processing system to install a rule to an object grid. A rules engine can be initialized in an object grid, wherein the rules engine is computer resources executing executable code. The computer, through use of its resources, executes the rules engine to update a business mapper. The rules engine receives a business rule definition to form a business rule. The rules engine determines that business terms are present in the business rule. The rules engine converts the business terms to technical terms based on the business mapper, responsive to a determination that business terms are present. The rules engine determines that the business rule comprises a temporal rule. The rules engine receives rule criteria, wherein the rule criteria is at least one selected from the group consisting of frequency, delay and timing dependency, responsive to the determination that the business rule is a temporal rule. The rules engine stores the business rule to the rules engine. The rules engine publishes the business rule to a publish-subscribe topic.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a business rule displayed in a graphical user interface in accordance with an illustrative embodiment of the invention;

FIG. 5 is a chart depicting a verbalization data structure in accordance with an illustrative embodiment of the invention;

DETAILED DESCRIPTION OF THE PREFERRED EMBODIMENT

Figure 1:
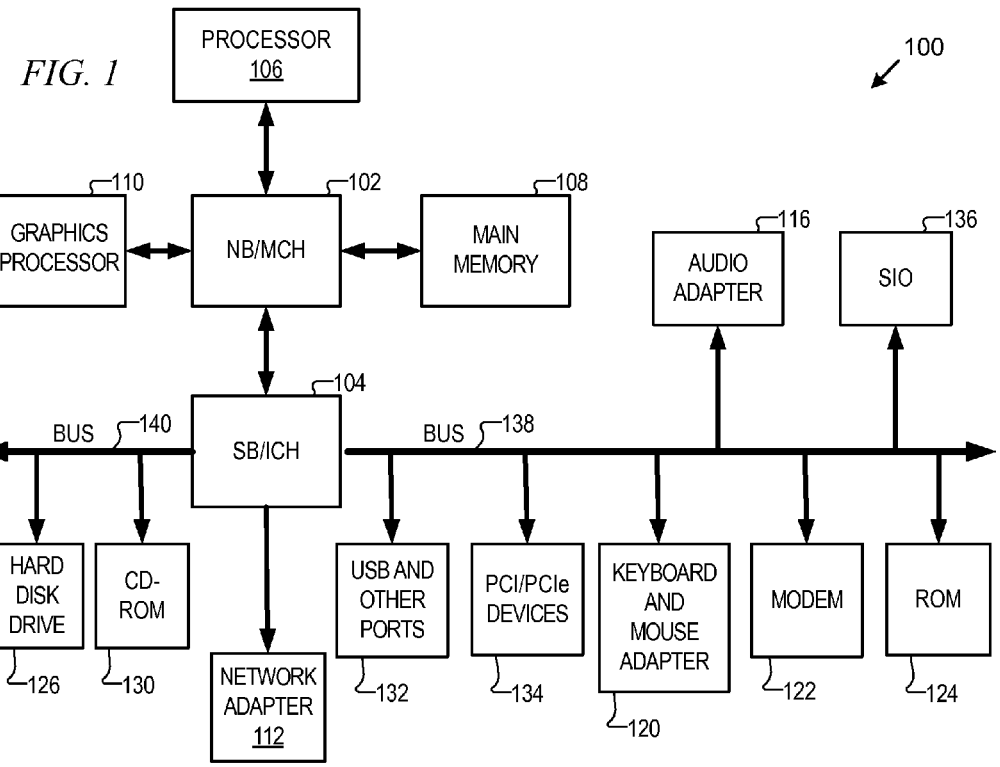
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable device(s) having computer readable program code embodied thereon.

Any combination of one or more computer readable storage device(s) may be utilized. The term "computer-readable storage device" does not encompass a signal propagation media such as a copper cable, optical fiber or wireless transmission media. A computer readable storage device may be, for example, but not limited to, an electronic, magnetic, optical, electromagnetic or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit technical descriptions of objects to be understandable and changeable by business people. Further, temporal rules may be implemented in a rules engine to permit historical events to influence operation of data processing systems to improve, for example, business continuity and/or profit. A rules engine is a virtual machine that, in response to receiving an event, tests the event against business rules in order to determine whether to further process steps including, for example, modifying working memory, transmitting an event to an object grid, or making a report to a user interface. An example of a rules engine is IBM WebSphere ILOG JRules or Java rules engine, a business rule management system (BRMS) that enables both business and IT users to write and maintain the logic applied by applications that automatically implement decisions. In the case of Jrules, the virtual machine may be a Java virtual machine (JVM). WebSphere™ is a trademark of IBM.

Figure 2A:
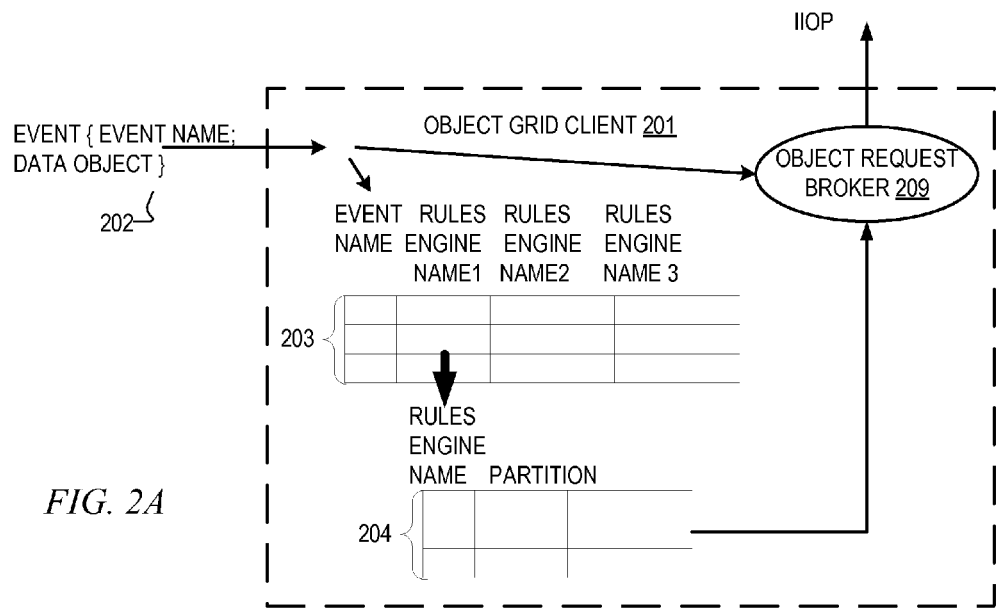
FIG. 2A is a block diagram of an object grid client in accordance with an illustrative embodiment of the invention.

FIG. 2A is a block diagram of an object grid client in accordance with an illustrative embodiment of the invention. An object grid is a collection of computers linked together into a grid that provides high availability for all of the objects saved within the grid. An event may reach an object grid client to initiate processing in the object grid. A rules engine can receive data by subscribing to receive that data from the object grid clients, such as, for example, object grid client 201. An event can be, for example, a submitted form from a website, that has information collected concerning parameters for a loan, including an applicant's credit score. As such, the intended process flow seeks to qualify a person or entity for a loan. Accordingly, the data may be linked to an event name, for example, loan_application. Event 202 includes an event name and associated data. In the bank loan example, the event name is loan_application and the data includes a credit score.

An object grid client has a table that associates the names of incoming events with the specific rules engines that have subscribed to receive the data within that event. For example, object grid client 201 relies on name table 203 to lookup a rules engine name to which to direct the event. After obtaining a rules engine name, the object grid client can look up a partition corresponding to the rules engine name in hash table 204. The partition is a unique identifier of the partition within the object grid. The partition may include an IP address. In addition, the partition may include an identifier of which partition among several at the IP address is the specific one hosting the rules engine.

Next, the object grid client 201 may rely on object request broker (ORB) 209 to form the partition and data into an Internet Inter-ORB Protocol (IIOP) message. The IIOP message is an event that carries the event name and the data object. However, in addition, the IIOP includes the rules engine name, which is used by server ORBs to route the IIOP message to the correct rules engine.

Figure 2B:
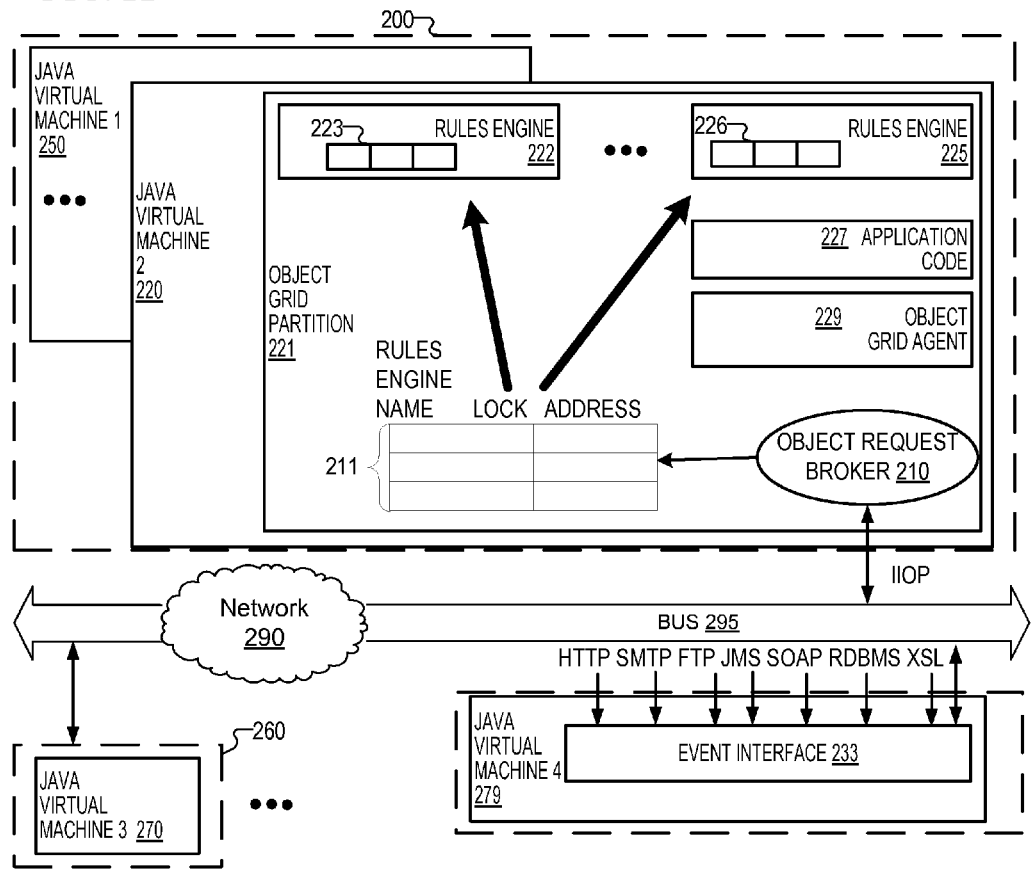
FIG. 2B is a block diagram of an object grid in accordance with an illustrative embodiment of the invention.

FIG. 2B is a block diagram of an of an object grid environment in accordance with an illustrative embodiment of the invention. Some features may be provided in the same manner as available in, for example, the WebSphere Extreme Scale platform. Java Virtual Machine (JVM) 1 250, hereafter JVM 1 250, is one software application that may execute in conjunction with the operating system. JVM 1 250 provides a Java run-time environment with the ability to execute Java application or applet, which is a program, servlet, or software component written in the Java programming language. FIG. 2B shows Java Virtual Machines as an illustrative embodiment of the invention, JVM 1 250, JVM 2 220, JVM 4 279 and networked JVM 3 270. The computer system in which JVM 1 250 and JVM 2 220 operates may be similar to data processing system 100 of FIG. 1, described above. However, JVM 1 250 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks and platform independence.

The JVM is a virtual computer, that is, a computer that is specified abstractly. Nevertheless, the JVM relies on computer resources, such as working memory 226, which may be a pool of physical memory such as main memory 108 of FIG. 1. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself software running on the processor. Examples of Java programs include rules engine 225, application code 227, and object grid agent 229. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The operation of JVMs supports the object grid environment. An object grid or object grid environment can include a collection of Java objects that are hosted on at least two data processing systems coupled together by a network. The object grid has at least two core features. First, the object grid replicates objects, including their state in different locations. Second, the object grid load balances work among objects so that additional computer resources can be added in a manner that permits the object grid to scale its processing, memory and storage according to the needs of the customers that rely on the object grid. Computer resources are at least memory and processing units available on a dedicated or timeshared basis. A processing unit can be a single core to a multiprocessor computer. Computer resources can include storage in disk media, as well as virtualized storage backed by volatile memory, non-volatile memory and block devices. In addition, computer resources can include access to networks and other I/O.

A grid partition object is a Java object that provides uninterruptible services to enterprises. The grid partition object coordinates with additional grid objects to replicate functions of an object so that there are plural instances of the object. Accordingly, if a JVM fails, an instance of the object may be able to rely on replicated state information to carry on the functions of the object that were supported by the failed JVM. For example, object grid partition 221 may be an instance of an object supported in JVM 2 220, which in turn relies on computer resources such as working memory 226 of data processing machine 200. Object grid partition 221 may contain Java programs such as rules engine 225, application code 227, and object grid agent 229.

The data processing system may receive an IIOP message. ORB 210 can initially process the IIOP message by relying on a rules engine name to lookup an applicable partition that hosts the rules engine. ORB 210 may rely on engine table 211 to locate the address for an unlocked partition. The IIOP message can be queued in response to a partition being in a locked state. When the partition is free, the object request broker can dispatch a processor to perform the rules engine. Accordingly, the engine table is used to initiate processing by an instantiated engine having the name of the rules engine described in the IIOP message. If the table has a null address for any looked up rules engine, object grid partition 221 may instantiate a rules engine having the rules engine name.

Thus, object grid partition 221 uses engine table 211 to select among rules engines, for example, rules engine 222 and rules engine 225 in order to obtain processing resources, as well as any state recorded within working memory 223 and working memory 226. The rules engines can be JRules engines, explained further below. A rules set may define criteria for handling events directed to a JRules engine. The rules engine, in whatever form, incorporates data structures of business rules and a business mapper, for example, as described below with reference to FIGS. 4 and 5.

JVM 3 270 may be remote from JVM 1 250 and JVM 2 220 and itself carry instances of objects that replicate those within object grid partition 221. Similarly, to enhance redundancy and robustness, a separate data processing system 260 may support JVM 3 270. Objects may rely on bus 295 to connect to network 290 to transport state, serialized objects, and events between data processing systems 200 and 260.

A distributed java object is a Java object that is hosted on a data processing system and has a replicated copy hosted on a second data processing system.

Events arriving to a JVM can be processed, for example, by event interface 223. An event interface combines an object grid agent with network interface code, such as object grid agent 229. The event interface can convert events that arrive using formats such as, for example, Hypertext Transport Protocol (HTTP), Simple Mail Transport Protocol (SMTP), File Transport Protocol (FTP), Java Message Service (JMS), Simple Object Access Protocol (SOAP), Relational Database Management System (RDBMS), and eXtensible Stylesheet Language (XSL), and the like. The event interface places the event in a bus and/or network.

The application code in the partition receives events from a network. Each event holds a flattened object. Application code 227 can convert the event payload into a Java object, and send the object through the network. Accordingly, the networked object grid agents may coordinate and exchange events as an object grid. Object grid agent 229 may adapt events received from a bus for further processing by application code. Conversely, application code 227 may rely on object grid agent 229 to place events onto the bus. Thus, the events can be accessible by the object grid.

An event is a message that includes at least a name and data corresponding to the name. The name can be one that is mapped to the specific business name on which the business rules are written. In other words, the name can be correlated to a matching business term using a business mapper, as explained further below. The message can be carried in a variety of packets and formats. Some packets or other organizing structures for an event are hypertext transport protocol (HTTP), transport control protocol and internet protocol (TCP/IP), and Java Message Service (JMS) formats. A network of computers may support the transport of events among its constituent devices by relying on message-oriented middleware (MOM). MOM is a system where messages are exchanged asynchronously between computers on a store and forward basis. An example of MOM is IBM Websphere Message Queue (MQ). Each application that relies on MOM can have an associated MOM software component locally present on the computer that hosts the application. In the IBM Message Queue, the event or message can include an MQ message descriptor and the message data.

A network of computers that each host MOM can work in a distributed manner to pass events or messages within the network. Such a network may support a publish/subscribe or pub/sub arrangement of distributing messages. A publish-subscribe topic is a federated system of distributing information among software components. One client/entity may register its subject interests, for example, A and B, for example in a pub/sub queue. A queue can be called toys. Another queue can be called books. The queue keeps a list of subscribers. When the queue gets something on a topic, it distributes that event to all subscribers registered with it. Accordingly, the client or application that registers interest to receive messages according to criteria is called a subscriber. On the other hand, a publisher is the application which transmits events or messages that are associated with one or more topics. Message-oriented middleware, and publish/subscribe services can be implemented, for example, in the manner described by WebSphere MQ V7.0 Features and Enhancements (January 2009), which is hereby incorporated by reference.

Figure 3:
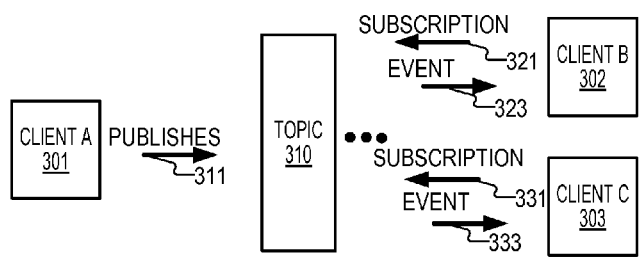
FIG. 3 is a block diagram of the interaction of clients with publish-subscribe topics in accordance with an illustrative embodiment of the invention.

FIG. 3 is a block diagram of the interaction of clients with publish-subscribe topics in accordance with an illustrative embodiment of the invention. Publish/subscribe messaging allows a data processing system to publish one message to many subscribers. A producing application, for example, client A 301, publishes a message on a given subject area, or publish-subscribe topic. In the object grid, the object grid client operates as client 301. Correspondingly, the object client sends the data to rules engines that are subscribers to it. Consumer applications, such as the rules engines, that have subscribed to the topic each receive a copy of the message. A consumer application can be a rules engine. A topic space is a hierarchy of publish-subscribe topics, with a publication point defined automatically on each messaging engine in an associated service integration bus. A client, such as client A 301, may publish a publish-subscribe topic with a publish message 311. Clients may subscribe to one among several publish-subscribe topics, for example, publish-subscribe topic 310. A topic can be, for example, "U.S. Open court assignments". Accordingly, client B 302 may make a subscription 321 using a subscribe message. An object grid may respond by delivering event 323 concerning the topic. Further subscription 331 and responsive event 333 may be sent to client C 303 concerning publish-subscribe topic 310. Accordingly, events may be distributed among several clients. The operation of the object grid may distribute the load of the events, as well as filter technical terms from events prior to a delivery of a modified event or other downstream events to a businessperson or other user.

The rules set, that is bound to a rules engine, is made up of two parts, namely, the business rules and the business mapper. Each is exemplified as, for example, business rule 400 of FIG. 4, and business mapper 500 of FIG. 5, respectively.

FIG. 4 is a business rule displayed in a graphical user interface in accordance with an illustrative embodiment of the invention. The technical names for the data objects are the names that are found in the events that add data to the object grid. Business rule dialog 400 can include a business rule that relies on business terms such as 'the borrower', 'the loan', and 'credit score below 200'. The business rule may be comprised of a condition introduction 'if' 401. A conditional statement 402 is expressed in business terms, which may be in a spoken language, for example, English. Next, a conditional transition term, 'then' 403 may be used to signal further steps that the data processing system may provide. In this case, two further steps are defined. The first step 404 can be, 'add "Credit score below 200" to the message of 'the loan'". The second step 405 is, 'reject 'the loan'". Collectively, the conditions and steps shown at 401-405 can comprise an example of a business rule. Business rules may be expressed in, for example, Business Action Language (BAL). Business Action Language is a business rule language provided with the ILOG™ Rules distribution. ILOG is a trademark of International Business Machines Corporation. A business action language may include a rule specified in the form "IF criteria THEN action". The business rule may be edited by a rules studio or any suitable editor.

A business rule may be understood with reference to temporal rules and process rules. A temporal rule is a conditional statement that inter-relates one or more events on the basis of time, frequency and/or order to determine if a condition is met. An example of a temporal rule may detect potential fraudulent use of a credit card. The rule can trigger further action, such as a fraud alert, in response to two uses of a specific credit card within a frequency period at a gas station. The frequency period may be intervals of use from 0 to 600 seconds between events concerning the credit card and the gas station. A business rule may reference data objects, which are, themselves, human readable. Each data reference within the data objects may be mapped to technical names. Accordingly, the native names of the business rule may be understandable to business people. In addition, the mapping may offer a way to supplement the meaning of such data with technical counterparts, as described below with reference to FIG. 5.

A process rule is a rule that defines the order in which a data processing system performs its functions, including, for example, I/O and data access. Among the functions may be, for example, publishing an event. Accordingly, a grid object may receive events through a subscription, and transmit additional events in response to receiving events.

A business rule, then, is at least one temporal or business rule expressed in business terms. A business rule definition is a business rule that is described according to the syntax of the applicable business language, for example, BAL, using business terms.

FIG. 5 is a chart depicting a verbalization data structure in accordance with an illustrative embodiment of the invention. A verbalization data structure is used by the business mapper to translate from technical terms to business terms and from business terms to technical terms. A verbalization data structure may, for example, be array 500. A verbalization data structure may be an ontology that depicts a hierarchy of relationships between technical terms and business terms. A business mapper is a software component executing on a data processing system to translate a technical term to at least one business term. The business mapper may also be configured to translate a business term to a technical term. The business mapper may be a Java object. Accordingly, a business rule that references a business term 'page not found' can be translated or otherwise mapped to the technical term "HTTP error 404". Accordingly, once a staff of information technology specialists populates a verbalization data structure with business terms, a business specialist may rely on an editor to formulate business rules, and then commit such rules to a rules object, described above.

A business specialist may create business rules by stating a condition using a drop-down list or other list selection mechanism to choose from available business terms. Accordingly, 'the borrower' can be one option among several presented in a drop down list, within business rule dialog 400 of FIG. 4. Further refinement and narrowing of a condition can be performed using mathematical or Boolean connectors between the business terms. Further drop down lists can be used to select Boolean terms such as 'and', 'or' and 'not' to couple business terms together.

Figure 6:
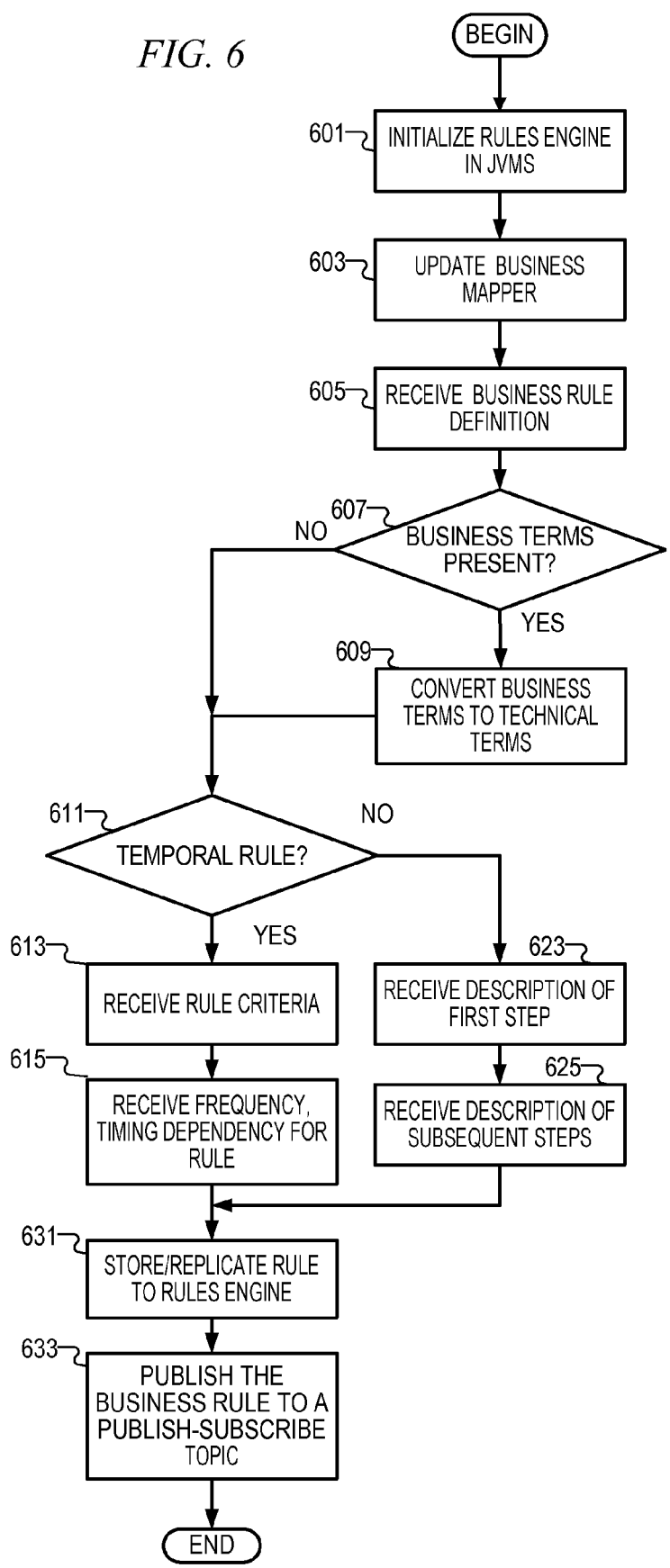
FIG. 6 is a flowchart of steps to add a business rule to a grid object environment in accordance with an illustrative embodiment of the invention.

FIG. 6 is a flowchart of steps to add a business rule to a grid object environment in accordance with an illustrative embodiment of the invention. Initially, a rules engine may be initialized in at least two JVMs (step 601). Initialization can include the JVM assigning time on a processor to execute the instructions of the rules engine. Part of the initialization of the rules engine may include establishing the object grid partition in a JVM, as well as starting application code and object grid agents. Each of these sub-steps may be performed by a data processing system as part of a booting or restarting process, or may be performed asynchronously. In addition, the rules engine may be a Java rules engine. Accordingly, step 601 can include installing the Java rules engine.

Next, a JVM may update a business mapper (step 603). Updating the business mapper may include a rules engine instantiation of one or more JVMs to operate as repositories that map technical features of the object grid environment to corresponding business terms, for example, by relying on array 500 of FIG. 5. One or more objects may publish and/or subscribe to events to the business mapper.

Next, a rules engine may receive a business rule definition (step 605). The business rule definition may be a file edited by a user, a rule automatically generated and forwarded to the rules engine, or a combination of the two. The business rule definition is explained further, above, with respect to FIG. 4. Next, the rules engine may determine if the business rule has business terms present in it (step 607). If step 607 is a positive determination, then the rules engine may convert the business terms to technical terms (step 609). Converting the business terms to technical terms may be based on the business mapper.

Following step 609 and a negative result to step 607, the rules engine may determine whether the business rule comprises a temporal rule (step 611). If the business rule includes a temporal rule, the rules engine may receive rule criteria (step 613). The rule criteria may be at least one selected from the group consisting of frequency, delay, and timing dependency. Accordingly, the rules engine may receive frequency, delay, or timing dependencies for the temporal rule (step 615).

However, a negative determination at step 611, may result in receiving a description of a first step (step 623). The rules engine may iteratively receive additional steps. Accordingly, the rules engine may receive descriptions of subsequent steps (step 625).

Following either step 615 or 625, the rules engine may store or replicate the business rule to the rules engine (step 631). The rule, though initially edited or received as a business rule, can be stored or otherwise converted using the technical terms corresponding to business terms in the business rule. Accordingly, the rule, thus stored, is in a form that can be executed within a rules engine. Optionally, the rules engine may replicate the business rule to other parts of the grid environment. Next, the rules engine may publish the business rule to a publish-subscribe topic (step 633). Processing terminates thereafter.

Figure 7:
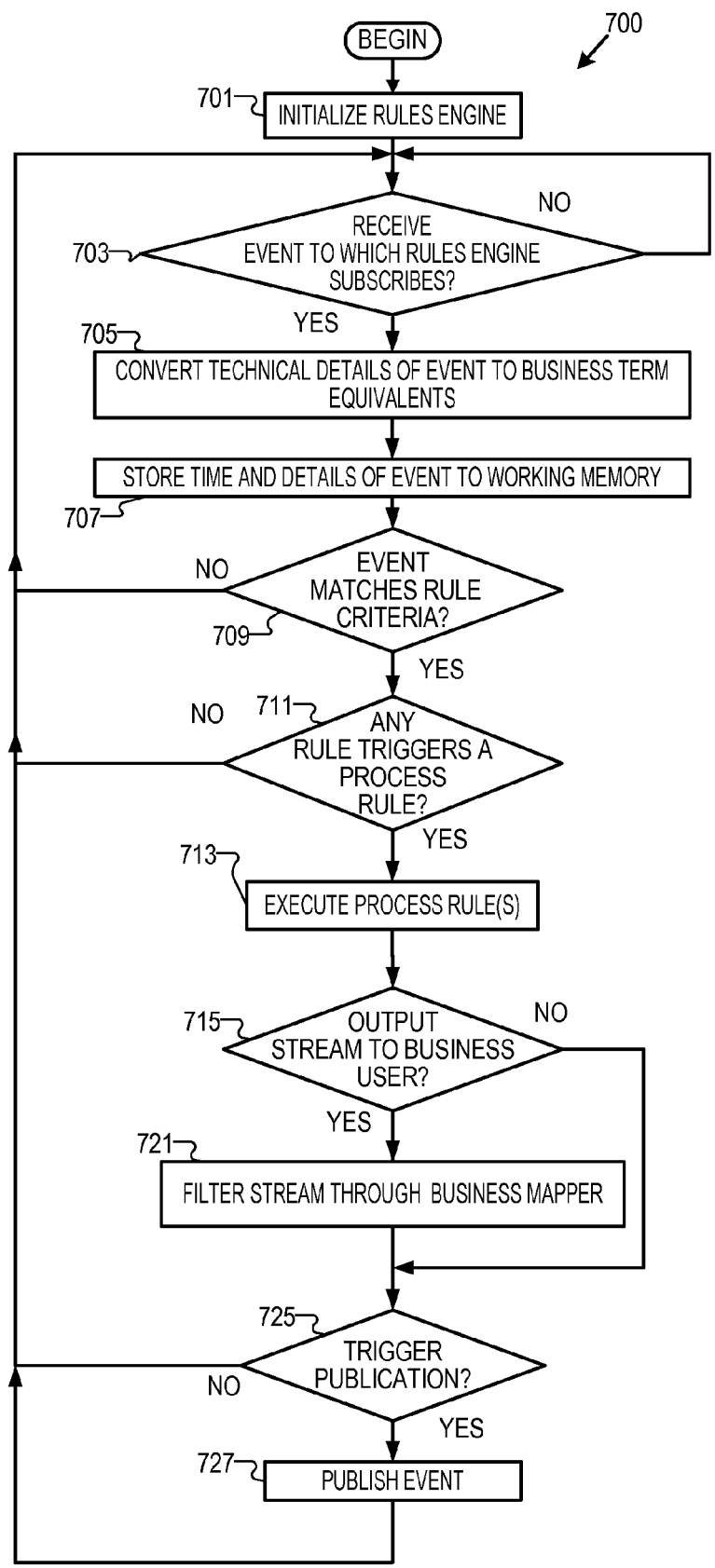
FIG. 7 is a flowchart in accordance with an illustrative embodiment of the invention.

FIG. 7 is a flowchart in accordance with an illustrative embodiment of the invention. The steps of process 700 may be performed by one or more rules engines. Initially, the rules engine initializes (step 701). Next, the rules engine may receive an event to which the rules engine subscribes (step 703). If no event arrives, step 703 repeats. However, in response to an event arriving, the rules engine may convert technical details of the event into business term equivalents (step 705). Next, the rules engine may store time and details of the event to working memory (step 707). Details of an event may include parameters and numbers, for example, a credit score. Each event stored to working memory forms a business event. A business event is a stored version of the received event using business terms where an equivalent exists for a corresponding technical term. The stored version can be yet another business object, which will have its own unique name. By storing details to working memory, the rules engine may establish an event history. The event history may be referred to in response to receiving subsequent events in order to determine if any rule criteria are met. An event history is a log of received events, including the time of receipt. The mechanism for creating the business object may be to invoke an object grid client to add the data concerning the event as a business object in the object grid. The data may be embellished to include actions, which may, in turn, be triggered to form events. Such events can be subscribed to by still further rules engines, devices or executing applications.

Next, the rules engine may determine if the event matches a rule criterion (step 709). This step may be performed by comparing an event history to the rule criterion. If the event fails to match, step 703 may be repeated. However, if the event matches a rule criterion, the rules engine may determine whether any rule triggers a process rule (step 711). If no rules trigger a process rule, step 703 may be repeated. However, if a rule is triggered, the rules engine may execute the process rule or rules (step 713). By 'execute' it is meant that the rules engine may obtain computer resources within the data processing system that supports the rules engine. On the other hand, 'executing' can also include recruiting another Java object in a second data processing system to perform the process rule. A Java object may add the process rule to an agenda. An agenda is a queue that prioritizes process rules in an order for execution.

Next, the rules engine may determine whether the process rule requires outputting a stream to a business user (step 715). A stream is an event or message that transports text or images meaningful to a human. A stream can be a message suitable for display to a dialog box. The stream can be an email. If the process rule requires outputting the stream to a business user, the rules engine may filter the stream through a business mapper (step 721).

Following step 721, or a negative result at step 715, the rules engine may trigger publication (step 725). Accordingly, in response to a positive result at step 725 the rules engine publishes the event (step 727). After step 727 or a negative outcome at step 725, the rules engine may continue processing at step 703. Process 700 may repeat indefinitely.

It can be appreciated that the event can be published as a newly added business rule. As such, the business rule can be subscribed to via a publish/subscribe topic.

Figure 8:
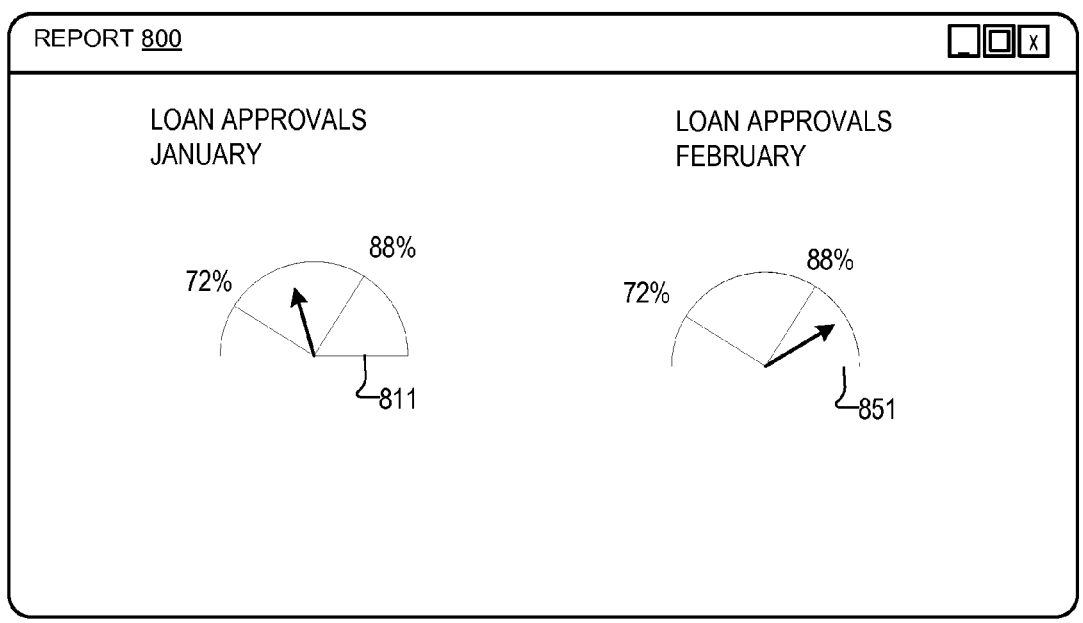
FIG. 8 is a dashboard in accordance with an illustrative embodiment of the invention.

FIG. 8 is a dashboard that can be representative of an outcome to publishing an event. An event can include data for rendering an html web page, or other data that may be displayed, printed, agreed-to online, etc. Accordingly, when dispatched or otherwise made renderable, an event is a business result. A business result can be reporting suspected fraud, making a loan, selling insurance, setting a price, or allocating inventory. As such, each such business result comes into existence when it is made available to a human user. By being available, the corresponding html, graphic or other file is stored to a retrieval device, such as a WWW server, and the user has access permissions to reach the data, locally or remotely. Accordingly, email can be an example of a suitable way to produce the business result.

FIG. 8 report 800 can be arranged to be accessible, for example, to a user such as bank vice president. Accordingly, events can be accumulated by the rules engines to identify a number of loans approved during a period in time, for example loan approvals in January 811. Similarly, events can be accumulated to report loan approvals in February 851.

Many other forms of reporting are possible using the rules engines described above.

The illustrative embodiments may permit collaboration of Java objects in several data processing systems to respond to events by posting events within a publish-subscribe exchange of events or messages. Such events may be resiliently stored as a business object capable of creating its own events, for example, through the use of an object grid client as a object constructor of an object having its own unique name. Terminology of the technical rule is expressed as business terms, and accordingly, their use in business rules permits additional classes of personnel to edit such business rules without resorting to dictionaries or specialized staff. Furthermore, outcomes of rules can be filtered or otherwise converted to a form that may be rendered to a client or browsers in a manner familiar to business people. In addition, further objects can be created in response to events received and processed by the combination of Jrules engines and grid object clients. Consequently, the events issuing from the new objects may be consumed by additional rules engines. Accordingly, the illustrative embodiments leverage staff to modify a resilient and scalable object grid.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable device providing program code for use by or in connection with a computer or any instruction execution system. For the purposes of this description, a computer-usable or computer-readable device can be any tangible apparatus that can store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product to install a rule to an object grid, the computer program product comprising:
   one or more computer-readable storage devices, having computer usable program code embodied therewith, the computer program product comprising:
   computer readable program code configured to initialize a rules engine among a plurality of rules engines in the object grid operating in a plurality of linked computers, wherein the rules engine is executable code executing using computer resources;
   computer readable program code configured to update a business mapper;
   computer readable program code configured to receive a business rule definition to form a business rule;
   computer readable program code configured to determine that business terms are present in the business rule, and in response;
   to convert the business terms to technical terms using the rules engine selected among the plurality of rules engines to look up a technical term from an array to find a corresponding business term;
   computer readable program code configured to determine that the business rule comprises a temporal rule;
   computer readable program code configured to receive rule criteria, wherein the rule criteria is at least one selected from the group consisting of frequency, delay and timing dependency, responsive to the determination that the business rule is the temporal rule;
   computer readable program code configured to store the business rule to the rules engine; and
   computer readable program code configured to publish the business rule to a publish-subscribe topic.

2. The computer program product of claim 1, wherein the object grid is at least two processors in a network environment configured to execute distributed java objects that permit caching of data and java objects among several computer resources.

3. The computer program product of claim 1, further comprising:
   computer readable program code configured to compare an event history to the rule criteria.

4. The computer program product of claim 1, wherein the business mapper is configured to lookup a technical term to find a corresponding business term.

5. The computer program product of claim 4, wherein the technical term and the business term are different.

6. The computer program product of claim 1, wherein the rules engine is a Java instruction set based rules engine.

7. A data processing system comprising:
   a bus;
   a storage device connected to the bus, wherein computer usable code is located in the storage device;
   a communication unit connected to the bus; and
   a processing unit connected to the bus, wherein the processing unit executes the computer usable code to install a rules engine among a plurality of rules engines in an object grid, wherein the rules engine is executable code executing using computer resources; initialize the rules engine in the object grid; update a business mapper; receive a business rule definition to form a business rule; determine that business terms are present in the business rule; convert the business terms to technical terms using the rules engine selected among the plurality of rules engines to look up a technical term from an array to find a corresponding business term from, responsive to a determination that business terms are present; determine that the business rule comprises a temporal rule; receive rule criteria, wherein the rule criteria is at least one selected from the group consisting of frequency, delay and timing dependency, responsive to the determination that the business rule is the temporal rule; store the business rule to the rules engine; and publish the business rule to a publish-subscribe topic.

8. The data processing system of claim 7, wherein the object grid is at least two processors in a network environment configured to execute distributed java objects that permit caching of data and java objects among several computer resources.

9. The data processing system of claim 7, wherein the processing unit further executes computer usable code to compare an event history to the rule criteria.

10. The data processing system of claim 7, wherein the business mapper is configured to lookup a technical term to find a corresponding business term.

11. The data processing system of claim 10, wherein the technical term and the business term are different.

12. The data processing system of claim 7, wherein the rules engine is a Java instruction set based rules engine.

* * * * *